United States Patent
Golner et al.

(10) Patent No.: US 9,281,098 B2
(45) Date of Patent: *Mar. 8, 2016

(54) DRY TYPE ELECTRICAL INSULATION

(75) Inventors: Thomas M. Golner, Pewaukee, WI (US); Shirish P. Mehta, Waukesha, WI (US); H. Jin Sim, Raleigh, NC (US)

(73) Assignee: Waukesha Electric Systems, Inc., Waukesha, WI (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/156,870

(22) Filed: Jun. 9, 2011

(65) Prior Publication Data

US 2012/0202059 A1 Aug. 9, 2012

Related U.S. Application Data

(60) Provisional application No. 61/441,109, filed on Feb. 9, 2011.

(51) Int. Cl.
*B32B 27/02* (2006.01)
*D04H 1/00* (2006.01)
(Continued)

(52) U.S. Cl.
CPC ............... *H01B 3/47* (2013.01); *B29C 70/028* (2013.01); *B29C 70/30* (2013.01); *B32B 5/26* (2013.01); *D06M 15/507* (2013.01); *D06M 15/53* (2013.01); *D06M 15/63* (2013.01); *D06M 17/04* (2013.01); *D06M 23/08* (2013.01); *H01B 3/301* (2013.01); *H01B 3/421* (2013.01); *B29B 15/122* (2013.01); *B32B 2255/02* (2013.01); *B32B 2255/26* (2013.01); *B32B 2262/0276* (2013.01); *B32B 2307/206* (2013.01);
(Continued)

(58) Field of Classification Search
CPC ................................................ D01F 8/00–8/18
USPC .......................... 442/331–336; 428/373, 374; 174/110 R–110 E, 137 R–137 B, 174/121 R–122 R, 124 R
See application file for complete search history.

(56) References Cited

U.S. PATENT DOCUMENTS 3,086,184 A * 4/1963 Nichols ........................... 336/60
4,009,306 A 2/1977 Yamashita et al.
(Continued)

FOREIGN PATENT DOCUMENTS

WO WO 2009059705 A1 * 5/2009
WO WO 2009062873 A1 * 5/2009

OTHER PUBLICATIONS

Steinwall Inc., Poly Butylene Terephthalate, Apr. 2013, http://www.steinwall.com/PDF/P-PBT.pdf.*
(Continued)

*Primary Examiner* — Jennifer Chriss
*Assistant Examiner* — Frank Vineis
(74) *Attorney, Agent, or Firm* — Baker & Hostetler LLP (57) ABSTRACT

A dry type electrical insulation is provided. The insulation includes a base fiber having an outer surface and a first melting point and a binder material, coated onto the outer surface of the base fiber, having a second melting point. In this insulation, the second melting point is lower than the first melting point. A dry type insulation matrix is also provided. The insulation matrix includes a plurality of composite fibers having a base fiber having a first melting point and a binder material co-extruded therewith, having a second melting point. In this insulation matrix, the second melting point is lower than the first.

16 Claims, 5 Drawing Sheets

(51) Int. Cl.
*D04H 1/541* (2012.01)
*H01B 7/00* (2006.01)
*H01B 3/50* (2006.01)
*H01B 3/47* (2006.01)
*D06M 15/507* (2006.01)
*D06M 15/53* (2006.01)
*D06M 15/63* (2006.01)
*D06M 17/04* (2006.01)
*D06M 23/08* (2006.01)
*B29C 70/02* (2006.01)
*B29C 70/30* (2006.01)
*H01B 3/30* (2006.01)
*H01B 3/42* (2006.01)
*B32B 5/26* (2006.01)
*B29B 15/12* (2006.01)

(52) U.S. Cl.
CPC .... *B32B 2307/702* (2013.01); *B32B 2307/704* (2013.01); *Y10T 428/2907* (2015.01); *Y10T 428/2929* (2015.01); *Y10T 428/2933* (2015.01); *Y10T 428/2969* (2015.01)

(56) References Cited

U.S. PATENT DOCUMENTS

| 4,235,950 | A |   | 11/1980 | Miedaner |             |
|-----------|---|---|---------|----------|-------------|
| 5,409,766 | A | * | 4/1995  | Yuasa et al. | 442/361 |
| 5,508,093 | A | * | 4/1996  | Mehdorn  | 428/219     |
| 5,721,397 | A | * | 2/1998  | Weinberg | 174/110 SR  |
| 6,132,868 | A | * | 10/2000 | Dean et al. | 428/364  |
| 6,926,961 | B2 |  | 8/2005  | Roth     |             |
| 2003/0039815 | A1 | * | 2/2003 | Roth | 428/292.1 |
| 2005/0004541 | A1 | * | 1/2005 | Roberts | 604/367 |
| 2007/0277592 | A1 | * | 12/2007 | Johansson et al. | 73/38 |
| 2007/0292674 | A1 | * | 12/2007 | Morin | 428/292.1 |
| 2009/0186217 | A1 | * | 7/2009 | Brzoskowski et al. | 428/339 |
| 2009/0253323 | A1 |   | 10/2009 | Mueller et al. | |
| 2012/0156956 | A1 | * | 6/2012 | Turpin et al. | 442/334 |

OTHER PUBLICATIONS

Lee, S. Synthesis and Thermal Properties of Poly(cyclohexylene dimethylene terephthalate-co-butylene terephthalate), Korea Polymer Journal, vol. 8, No., pp. 261-267 (2000).*

Santa Clara University Engineering Design Center, PETG, accessed Nov. 25, 2013, <http://www.dc.engr.scu.edu/cmdoc/dg_doc/develop/material/resins/a4000014.htm>.*

Dictionary.com, "Laminate", accessed May 14, 2014, <http://dictionary.reference.com/browse/laminate>.*

Dictionary.com, "Sheet", accessed May 14, 2014, <http://dictionary.reference.com/browse/sheet>.*

Dahiya, "Dry-Laid Nonwovens", accessed May 19, 2014, <www.engr.utk.edu/mse/textiles/dry_laid_nonwovens.htm.*

The Nonwovens Institute, Nonwovens: Tutorial, accessed Sep. 15, 2014, pp. 1, 93, and 94 http://www.tappi.org/content/divisions/net/tutorial.pdf.*

Fiber Innovation, "Staple Fibers", http://www.fitfibers.com/product.htm, archived Jun. 5, 2004.*

Iroh, Polyethylene Terephthalate, Polymer Data Handbook, pp. 558-560, 1999.*

Raghavendra, "Bicomponent Fibers", www.engr.utk.edu/mse/Textiles/Bicomponent fibers.htm, pp. 1-8, Apr. 2004.*

International Search Report of PCT/US2012/024432 filed Feb. 9, 2012, Waukesha Electric Systems, Inc.

* cited by examiner

DRY TYPE ELECTRICAL INSULATION

FIELD OF THE INVENTION

The present invention generally relates to electrical insulators. More particularly, the present invention pertains to use of binder materials in electrical insulators.

BACKGROUND OF THE INVENTION

Electrical insulators, or dielectrics, are utilized in a variety of items to separate electrical conductors. Insulators can be dry type or fluid-filled. Fluid filled insulators insulate conductors by using a fluid such as oil. Fluid filled insulators are best suited for high heat applications, such as large industrial complexes. However, fluid filled insulators are costly to manufacture and costly to maintain. Dry type insulators are better suited for ranges of temperatures that are more moderate such as for example, homes and small businesses, and they require less maintenance.

Typical dry type insulators incorporate staple fibers such as aramid or mica. In order to form a matrix of these fibers, a varnish is used. The fibers and varnish are blended together to form the matrix which is then formed into the insulator. This creates more processing steps and does not yield ideal mechanical properties because the varnish does not add strength to the fibers. Further, the additional processing steps add to the cost of manufacturing.

Accordingly, it is desirable to provide a dry type insulator capable of providing insulation in higher temperature ranges, having better mechanical properties, while also reducing or removing additional processing steps that result in overall reduction in cost.

SUMMARY OF THE INVENTION

The foregoing needs are met, to a great extent, by the present invention, wherein a dry type electrical insulator is formed that can operate at high temperatures, has strong mechanical properties, has fewer processing steps and entails less cost.

In one embodiment, a dry type electrical insulation is provided that includes a base fiber having an outer surface and a first melting point and a binder material, coated onto the outer surface of the base fiber, having a second melting point. In this embodiment, the second melting point is lower than the first melting point.

In another embodiment, a dry type insulation matrix is provided that includes a plurality of composite fibers having a base fiber having a first melting point and a binder material co-extruded therewith, having a second melting point. In this embodiment, the second melting point is lower than the first.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
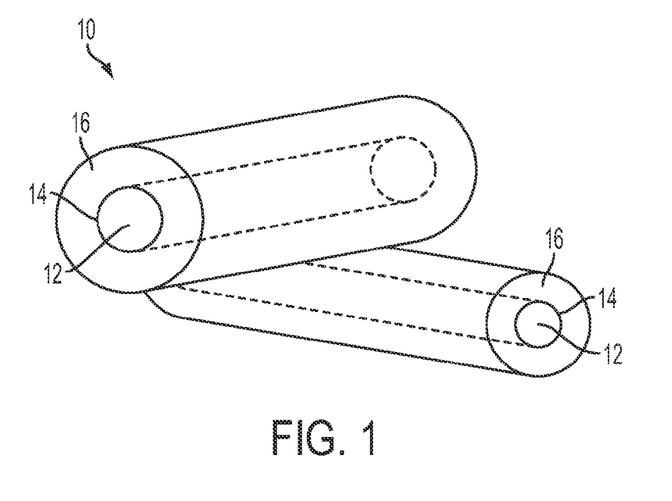
FIG. 1 is a perspective view of components for dry type electrical insulation in accordance with an embodiment of the present invention.

Embodiments of the present invention will now be described with reference to the drawing figures, in which like reference numerals refer to like parts throughout. FIG. 1 is a perspective view of components for dry type electrical insulation in accordance with an embodiment of the present invention. In particular, FIG. 1 shows two composite fibers 10, where the composite fiber 10 includes a base fiber 12 having an outer surface 14. The outer surface 14 is coated with a sheath of a binder material 16.

The base fiber 12 can be made from a staple fiber such as wool, hemp, raw cotton, flax, aramid, mica or other natural material. The base fiber 12 can also be made from a thermoplastic such as polyethylene terephthalate (PET), polyphenylene sulphide (PPS), polyetherimide (PEI), polyethylene napthalate (PEN), polyethersulfone (PES) or polybutylene terephthalate (PBT) and/or combinations thereof. Generally, the base fiber 12 is formed of a material having a high melting point.

The binder material 16 is preferably an amorphous or crystalline thermoplastic material. More particularly, the binder material 16 can be formed from at least one of a copolymer of polyethylene terephthalate (CoPET), polybutylene terephthalate (PBT), or undrawn polyphenylene sulphide (PPS) and/or combinations thereof. The melting point of the binder material 16 is lower than the melting point of the base fiber 12. At typical processing temperatures of about 220-240° C., or about 20° C. above the melting point of the binder material 16, the binder material 16 melts and adheres to other composite fibers 10, forming a strong matrix with better mechanical properties than conventional dry type insulation materials. Alternately, the binder material 16 can be any material suitable for the operating temperature and mechanical strength requirement based on the device to be insulated.

For instance, if the binder material melts at 220° C. a suitable base fiber 12 would be one that would not melt until at least 250° C. The operating temperature of the insulation would be lower than the melting point of either the binder material or the base fibers so that the matrix does not melt during operation, for example, in the range of 150-200° C. Such a material could be suitable for an application in a device that has approximately 200° C. continuous operation. Dry type insulation of the prior art has not been able to accommodate such a high temperature range. Thus, embodiments of the present invention allow for dry type insulation to be utilized at a higher temperature range than would otherwise be possible.

Preferably, the binder material 16 can be compressible to a high density material on the order of about 0.50 to about 1.10 g/cc, and have the ability to bond the base fibers 12, while maintaining good dielectric properties. Additionally, within this range, the mechanical properties are strong enough for most applications within the dry type electrical apparatus. Embodiments of this invention will also allow the binder material 16 to be chosen such that the processing temperature will be above the anticipated operating temperature. Because the binder material 16 is incorporated directly on the surface of the base fiber 12 and is co-extruded with the base fiber 12, there is no requirement for impregnation with a varnish system.

In an embodiment of the present invention, it is possible to vary the amount of base fibers 12 that include the binder material 16. For example, at 100% loading, all of the base fibers 12 are co-extruded with the binder material 16. During processing, the binder material 16 melts and adheres to other composite fibers 10 to form a matrix. When 100% of the fibers in the matrix include the binder material 16, (or there is a 100% loading, referring to the percentage of base fibers 12 that are coated with the binder material 16), a very strong, rigid matrix is formed. However, this can be very costly. Further, some applications do not require such rigidity and strength. It has also been found that at 100% loading, the porosity of the completed matrix is reduced, which can be undesirable in certain applications.

As another example, it may be desirable to incorporate only 50% of base fibers that are co-extruded with binder material 16. The other 50% of the base fibers 12 would be left bare. In this instance, raising the processing temperatures above the melting point of the binder material 16 ensures that the binder material 16 melts and binds the base fibers 12 of the coated and uncoated base fibers 12. The binder material 16 on half of the base fibers 12 will allow all of the fibers to adhere to each other, acting as binder for the entire matrix. Thus, a 50% loading, referring to the percentage of the coated base fibers 12, still yields strength but lowers costs. There is also some amount of porosity.

Therefore, the load of the base fibers, or the percentage of the base fibers 12 coated with binder material 16, can be varied, depending on the mechanical strengths and costs, as desired. In embodiments of the present invention, 50-100% loading is preferable. Some instances have shown that 70-80% loading is acceptable for most normal applications, including ranges and limits there between. Consideration on the percentage of loading is also based on the type of base fiber 12 that is used. A traditionally weaker base fiber may require greater loading, whereas a stronger base fiber may require less loading.

Figure 2:
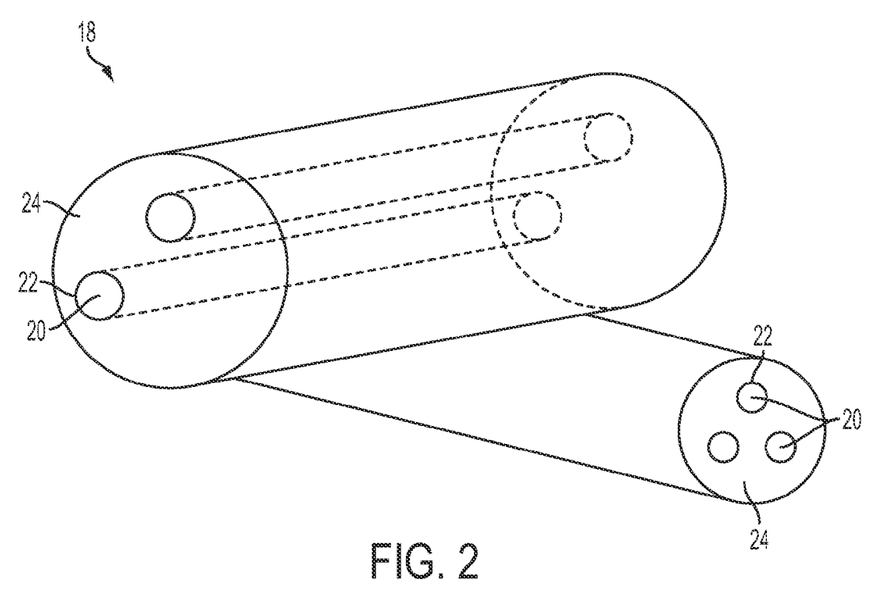
FIG. 2 is a perspective view of components for dry type electrical insulation in accordance with another embodiment of the present invention.

FIG. 2 illustrates a perspective view of components for dry type electrical insulation in accordance with another embodiment of the present invention. As shown in FIG. 2, a composite fiber 18 includes numerous base fibers 20 having outer surfaces 22. The outer surfaces 22 are all covered with a single coating of a binder material 24. The binder material 24 can be co-extruded over the outer surfaces 22 of the base fibers 20 forming a multiple core structure of base fibers 20. These two composite fibers 18 can then be bonded together using heat and pressure to form a matrix of the dry type insulation. The number of base fibers 20 that are co-extruded together with the binder material 24 can be varied as desired.

Figure 3:
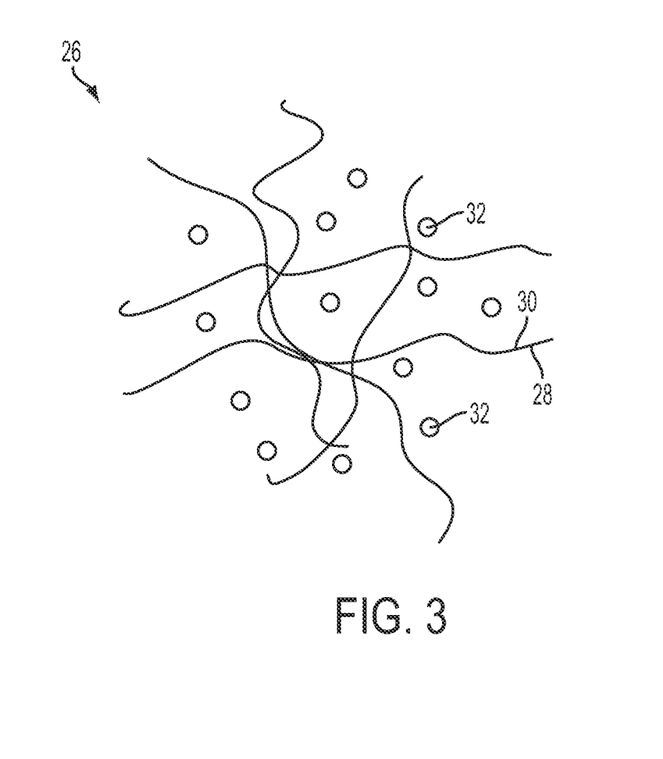
FIG. 3 is a perspective view of components for dry type electrical insulation in accordance with yet another embodiment of the present invention.

FIG. 3 is a perspective view of components for dry type electrical insulation in accordance with yet another embodiment of the present invention. The composite structure 26 of FIG. 3 includes base fibers 28 having outer surfaces 30. Particles of binder material 32, in the form of a powder are incorporated during processing. The base fibers 28 and the binder material powder 32 are air blended and heated to a temperature above the melting point of the binder material 32, allowing the binder material 32 to melt and adhere to the base fibers 28. This embodiment allows for a high amount of porosity.

Figure 4:
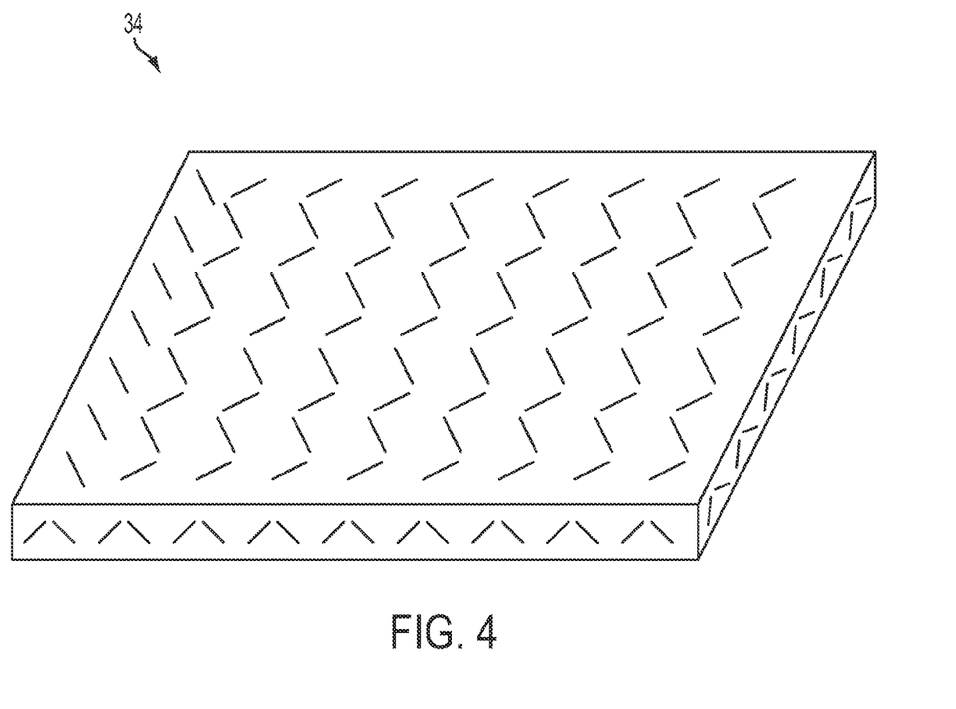
FIG. 4 is a perspective view of a matrix formed using any of the embodiments as shown in FIGS. 1, 2 and/or 3.

FIG. 4 is a perspective view of a matrix 34 formed using any of the embodiments as shown in FIGS. 1, 2 and/or 3. The diameter of each base fiber is typically on the order of microns and the length of each base fiber is typically on the order of millimeters or centimeters. As such, thousands or even millions of such composite fibers 10 are bound together to form the dry type electrical insulation matrix 34 described herein.

Figure 5:
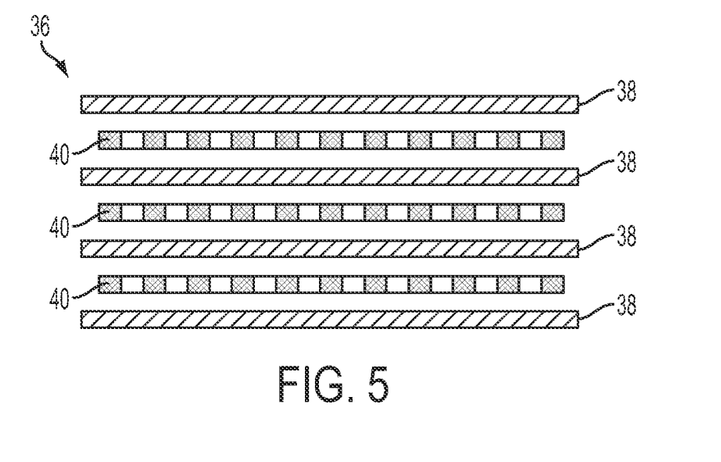
FIG. 5 is a cross sectional view of a first step in forming a laminate in accordance still another embodiment of the present invention.
Figure 6:
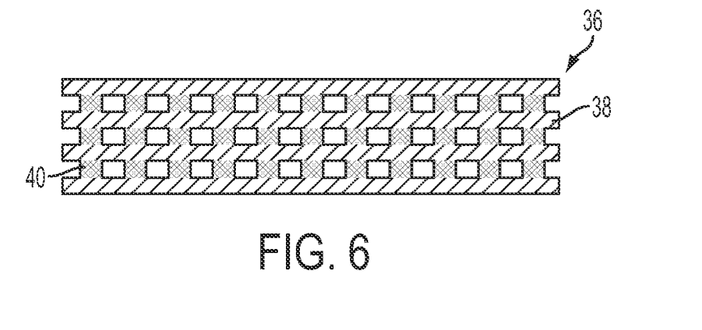
FIG. 6 is a cross sectional view of a second step in forming the laminate of FIG. 4.

FIGS. 5 and 6 illustrate processing steps during formation of a laminate 36 of an insulator and a conductor. As shown in FIG. 5, sheets of conductor material 38 can be layered with dry type insulation 40. The insulation 40 is formed as discussed with respect to FIGS. 1, 2, and/or 3. Heat and pressure are applied to press the conductor 38 to the insulation 40 to form the finished laminate 36. FIG. 6 illustrates such a formed laminate 36 after heat and pressure are applied, bonding the insulation 40 to the conductor 38. Alternately, the material can be formed or bonded in place in the device to be insulated or pre-formed and wrapped around or placed in the device to be insulated.

For example, the layers can be placed in the device to be insulated and then heat can be applied, melting the layers together. In an embodiment of the present invention, the layers of insulation 40 are longer than the layers of the conductor 38. This allows for the insulation 40 to prevent contact of the layers of conductor 38 so that the laminate 36 does not short out. The longer length of the layers of insulation 40 also form a cap over the laminate 36. The sizes, lengths, widths, of the composite fibers, the particulates and the laminates can all be varied as desired.

Figure 7:
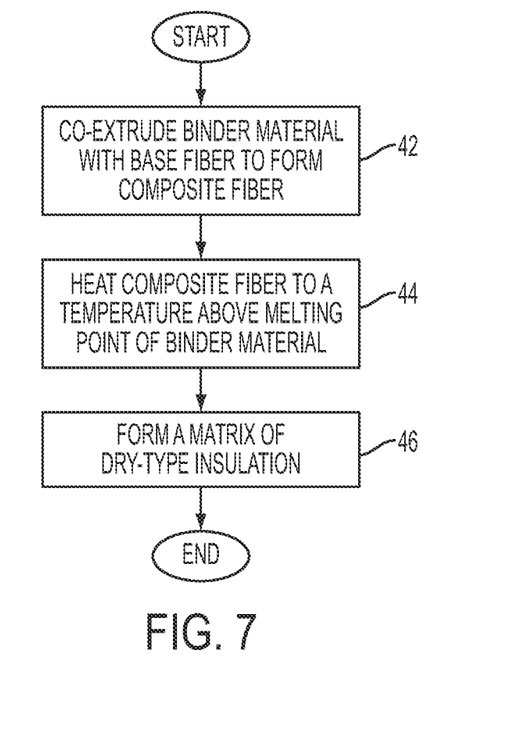
FIG. 7 is a flow diagram of a method for fabricating the dry type insulation according to embodiments of the present invention.

FIG. 7 is a flow diagram of a method for fabricating the dry type insulation according to an embodiment of the present invention. Step 42 includes forming a composite fiber by co-extruding a base fiber with binder material. The base fiber can have a first melting point and the binder material can have a second melting point which is lower than the first melting point. Step 44 includes heating the composite fibers to a temperature above the second melting point, but below the first melting point. Step 46 includes forming a matrix of the composite fibers by compression. As discussed previously, the percentage of the base fibers that include the binder material may be varied as desired.

Additionally, the method can include layering the base fiber and binder material between layers of a sheet conductor to form a laminate of the sheet conductor. The compressing and heating steps 44 and 46 can further include compressing and heating such that the resulting dry type electrical insulation has a density of between approximately 0.5 g/cm$^3$ and approximately 1.10 g/cm$^3$.

Further, the method of FIG. 7 can include forming the dry type insulation in place around the device to be insulated. The method can include co-extruding the binder material over the first outer surface of the base fiber, or alternately, co-extruding the binder material over the outer surface of multiple base fibers such that multiple base fibers form a multi-fiber core. The method can also include dispersing small particles of the binder material between the multiple base fibers.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An electrical component comprising:
   a first portion of an electrical conductor component;
   a second portion of the electrical conductor component;
   a third portion of the electrical conductor component;
   a first portion of a dry type electrical insulation structure, positioned between the first portion of the conductor component and the second portion of the conductor component;
   a second portion of a dry type electrical insulation structure, positioned between the second portion of the conductor component and the third portion of the conductor component;
   the first portion of an electrical conductor component, the second portion of an electrical conductor component, the third portion of an electrical conductor component, the first portion of a dry type electrical insulation structure, and the second portion of a dry type electrical insulation structure configured to form a laminate structure;
   the first portion of a dry type electrical insulation structure and the second portion of a dry type electrical insulation structure being longer than the first portion of an electrical conductor component, the second portion of an electrical conductor component, and the third portion of an electrical conductor component to prevent contact between the first portion of an electrical conductor component, the second portion of an electrical conductor component, and the third portion of an electrical conductor component; and
   the first portion of a dry type electrical insulation structure and the second portion of a dry type electrical insulation structure including:
      first base fibers having an outer surface and a first melting point; and
      a binder material, having a second melting point, wherein the second melting point is lower than the first melting point,
      wherein 70%-80% of the first base fibers are arranged as a bicomponent structure having the binder material coated onto the outer surface of the first base fibers and 20%-30% of the first base fibers are not co-extruded with the binder material, the first base fibers which are not coextruded with the binder material comprising the same material as the first base fibers which are coated with the binder material; and
      wherein the bicomponent structure comprises at least one of a core/sheath arrangement or an islands in the sea arrangement; and
      wherein the dry type electrical insulation further comprises a density of between 0.5 g/cm$^3$ and 1.10 g/cm$^3$.

2. The electrical component of claim 1, wherein the bicomponent structure is formed by co-extruding the binder material over a first outer surface of the first base fibers.

3. The electrical component of claim 1, wherein a plurality of bicomponent structures are formed by co-extruding the binder material over a first outer surface of a plurality of first base fibers.

4. The electrical component of claim 1, wherein a matrix is formed by heating the first base fibers and the binder material to the second melting point.

5. The electrical component of claim 4, wherein the matrix of the first base fibers and binder material are layered between layers of a sheet conductor to form a laminate.

6. The electrical component of claim 1, wherein the first portion of as dry type electrical insulation structure and the second portion of a dry type electrical insulation structure further comprise a staple fiber which is stable at a temperature needed to melt the binder material.

7. The electrical component of claim 1, wherein the first base fibers comprise at least one of polyethylene terephthalate (PET), polyphenylene sulphide (PPS), polyetherimide (PEI), polyethylene napthalate (PEN), polybutylene terephthalate (PBT), polyethersulfone (PES) and/or combinations thereof.

8. The electrical component of claim 1, wherein the binder material comprises one of at least an amorphous and a crystalline thermoplastic material.

9. The electrical component of claim 1, wherein the binder material comprises at least one of a copolymer of polyethylene terephthalate (CoPET), polybutylene terephthalate (PBT), undrawn polyphenylene sulphide (PPS) and/or combinations thereof.

10. An electrical component, comprising:
    a first portion of an electrical conductor component;
    a second portion of the electrical conductor component;
    a third portion of the electrical conductor component;
    a first portion of a dry type electrical insulation matrix, positioned between the first portion of the conductor component and the second portion of the conductor component;
    a second portion of a dry type electrical insulation matrix, positioned between the second portion of the conductor component and the third portion of the conductor component;
    the first portion of an electrical conductor component, the second portion of an electrical conductor component, the third portion of an electrical conductor component, the first portion of a dry type electrical insulation matrix, and the second portion of a dry type electrical insulation matrix configured to form a laminate structure;
    the first portion of a dry type electrical insulation matrix and the second portion of a dry type electrical insulation matrix being longer than the first portion of an electrical conductor component, the second portion of an electrical conductor component, and the third portion of an electrical conductor component to prevent contact between the first portion of an electrical conductor component, the second portion of an electrical conductor component, and the third portion of an electrical conductor component; and the first portion of a dry type electrical insulation matrix and the second portion of a dry type electrical insulation matrix:
- a plurality of composite fibers having first base fibers having a first melting point and a binder material having a second melting point co-extruded therewith, wherein the second melting point is lower than the first,
- wherein the composite fibers are arranged as a bicomponent structure comprising at least one of a core/sheath arrangement or an islands in the sea arrangement;
- wherein the matrix further comprises additional base fibers that are not co-extruded with the binder material, the additional base fibers comprising the same material as the first base fibers, the composite fibers comprising 70%-80% of the combined composite fibers and the additional base fibers; and
- wherein the dry type electrical insulation further comprises a density of between 0.5 g/cm3 and 1.10 g/cm3.

11. The electrical component of claim 1, wherein the first base fibers comprise at least one of polyethylene terephthalate (PET), polyphenylene sulphide (PPS), polyetherimide (PEI), polyethylene napthalate (PEN), polybutylene terephthalate (PBT), polyethersulfone (PES) and/or combinations thereof; and
wherein the binder material comprises at least one of a copolymer of polyethylene terephthalate (CoPET), polybutylene terephthalate (PBT), undrawn polyphenylene sulphide (PPS) and/or combinations thereof.

12. The electrical component of claim 10, wherein the first base fibers and/or additional base fibers comprise at least one of polyethylene terephthalate (PET), polyphenylene sulphide (PPS), polyetherimide (PEI), polyethylene napthalate (PEN), polybutylene terephthalate (PBT), polyethersulfone (PES) and/or combinations thereof; and
wherein the binder material comprises at least one of a copolymer of polyethylene terephthalate (CoPET), polybutylene terephthalate (PBT), undrawn polyphenylene sulphide (PPS) and/or combinations thereof.

13. The electrical component of claim 1, wherein the first portion of an electrical conductor component, the second portion of an electrical conductor component, and the third portion of an electrical conductor component are each configured as a sheet of conductor material.

14. The electrical component of claim 10, wherein the first portion of an electrical conductor component, the second portion of an electrical conductor component, and the third portion of an electrical conductor component are each configured as a sheet of conductor material.

15. The electrical component of claim 1, wherein the bicomponent fibers and the non-coextruded base fibers comprise one type of base fiber.

16. The electrical component of claim 10, wherein the composite fibers and the additional base fibers comprise one type of base fiber.

* * * * *